United States Patent [19]

Norton et al.

[11] Patent Number: 5,085,408
[45] Date of Patent: Feb. 4, 1992

[54] TRAILER CONNECTING GUIDE

[76] Inventors: Ronald L. Norton, Route #2, Box 683, Graham, N.C. 27253; James R. Turner, 1233 Rockledge Dr., Burlington, N.C. 27217

[21] Appl. No.: 512,877

[22] Filed: Apr. 23, 1990

[51] Int. Cl.$^5$ .......................... B66D 1/36; B60D 1/36
[52] U.S. Cl. ..................... 254/325; 254/334; 280/477
[58] Field of Search ............ 280/480, 480.1, 477, 280/479.3, 414.1–414.3, 490.1; 74/502.6; 474/144, 151, 198; 254/4 R, 47, 127, 134.3 R, 325, 334, 389, 411, 326, 327, 383, 335, 336, 403, 411

[56] References Cited

U.S. PATENT DOCUMENTS

| | | | |
|---|---|---|---|
| 979,514 | 12/1910 | Kray | 254/134.3 R |
| 2,363,353 | 11/1944 | Parker | 254/411 X |
| 2,708,045 | 5/1955 | Shontz | 214/506 |
| 2,747,747 | 5/1956 | Klare | 254/411 X |
| 3,201,144 | 8/1965 | Smyser | 280/477 |
| 3,807,696 | 4/1974 | Brda | 254/411 X |
| 3,938,122 | 2/1976 | Mangus | 280/477 X |
| 4,034,616 | 7/1977 | Rauscher | 474/198 |
| 4,511,159 | 4/1985 | Younger | 280/477 |
| 5,009,445 | 4/1991 | Williams, Jr. | 280/477 |

FOREIGN PATENT DOCUMENTS

| | | | |
|---|---|---|---|
| 2082998 | 3/1982 | United Kingdom | 254/334 |
| 2210837 | 6/1989 | United Kingdom | 280/480 |

*Primary Examiner*—Mitchell J. Hill
*Assistant Examiner*—Victor E. Johnson
*Attorney, Agent, or Firm*—Rhodes, Coats & Bennett

[57] ABSTRACT

A trailer connecting guide for use with a boat trailer or the like. The trailer connecting guide is attached to one side of the tongue of the trailer and is operable to guide the trailer sufficiently close to the tow vehicle to complete the connection. The trailer connecting guide assembly includes a pulley, a mounting bolt, and a winch cable guide. The cable guide is mounted between the pulley and trailer tongue and includes at least one elongated slot adjacent to the pulley track which restricts the lateral movement of the winch cable with respect to the pulley track to prevent the winch cable from pumping out of the pulley track. In operation, a length of cable is first let off the winch and the end of the winch cable is attached to the towing vehicle adjacent the vehicle hitch. A portion of the cable is then slipped around the pulley and guide assembly and any excess slack in the cable is taken up by operation of the winch. Then, as the winch continues to be operated, the trailer tongue and vehicle hitch are brought together sufficiently close to permit the connection to be completed.

8 Claims, 2 Drawing Sheets

TRAILER CONNECTING GUIDE

BACKGROUND OF THE INVENTION (1) Field of the Invention

The present invention relates generally to trailers and hitches for connecting tow vehicles and trailers and, more particularly, to a device for aligning a towing vehicle with a trailer to be towed so the mating members of each can be easily engaged to complete the connection.

(2) Description of the Prior Art

Recreational trailers, such as boat trailers and campers, are often connected by only one person since usually other family members are busy with other tasks associated with packing or unpacking. Thus, the person must repeatedly back the vehicle up and check the alignment of the trailer and vehicle until the vehicle and trailer are close enough together to be manhandled the remaining distance to complete the connection. When two persons are available, one can drive the vehicle and one can position the trailer tow with respect to the hitch. Otherwise, the process is essentially the same.

It can be very difficult to correctly position the vehicle and trailer for easy connection. This is particularly the case for recreational vehicles since they are used infrequently and sporadically and generally by non-professional drivers. As a result, many injuries and much damage to vehicles and trailers occur each year. In addition, partially disabled persons and those persons with back problems do not have sufficient strength to complete the connection.

Various approaches have been tried to overcome these problems. One such approach is set forth in U.S. Pat. No. 3,201,144, issued to Smyser. Smyser discloses a trailer connecting apparatus for positioning the tongue of a trailer in coupling relation to a towing vehicle. The trailer connecting apparatus includes a combined cable and tongue guide bracket which is attached to the trailer tongue. The apparatus also includes a guide ramp adapted to be extended between the trailer and the towing vehicle and to provide an elongated V-shaped channel for receiving the tongue guide member. The trailer winch cable is attached to the towing vehicle and, as the winch is operated, the tongue of the trailer is positioned in coupling relation to the towing vehicle. The guide ramp includes a open slot adjacent to the vehicle ball hitch into which the tongue guide drops when the hitch and ball are properly positioned, thereby permitting the guide ramp to be more easily removed.

A somewhat similar approach is set forth in U.S. Pat. No. 2,708,045, issued to Shontz. Shontz teaches an improved boat trailer having a number of features. One feature is a pulley attached to the lower part of the trailer frame just below the winch and just ahead of the winch extension. The pulley can be used to route the trailer winch cable to a towing vehicle. Operation of the winch then brings the trailer and vehicle together.

Certain disadvantages become apparent upon a careful review of the above patents. For example, both the Smyser and Shontz devices require the extra step of passing the winch cable through the opening formed between the pulley and its U-shaped support bracket both before and after connecting the tow vehicle and trailer. In addition, since the pulley is mounted on the upper surface of the tongue and, necessarily, ahead of the winch, the direction of pull of the winch cable is off center and generally upward. Smyser approach to correcting this problem is to add a ramp guide and follower which adds additional cost and requires further modification of the trailer and tow vehicle.

Another approach is set forth in U.S. Pat. No. 4,511,159 issued to Younger. Younger discloses a system for aligning mating members of a tow vehicle and trailer which includes an elongated guide bar attached to and extended away from the rear of the tow vehicle and adapted to permit contact of the guide bar with the trailer's jack shaft when the tow vehicle is backed up to the trailer. The system includes moving means which is then attached to the guide bar and used to move the trailer's jack shaft along the guide bar to place the mating members in vertical alignment. The moving means is then removed and the jack shaft is lowered to complete the connection. However, the guide system as taught by Younger does not provide any means for initially bringing the jack shaft into contact with the guide bar.

Thus, there remains a need for a new and improved trailer connecting guide which is operable to align a towing vehicle with a trailer to be towed so the mating members of each can be more easily engaged to complete the connection and, in addition, does not require the extra step of passing the winch cable through the opening formed between the pulley and its U-shaped support bracket both before and after connecting the tow vehicle and trailer.

SUMMARY OF THE INVENTION

The present invention is directed to a device for use with a boat trailer or the like which is attached to one side of the tongue of the trailer and is operable to guide the trailer sufficiently close to the tow vehicle to complete the connection. The present invention includes a pulley, a mounting bolt, and a winch cable guide. The cable guide is mounted between the pulley and trailer tongue and includes at least one elongated slot adjacent to the pulley track which restricts the lateral movement of the winch cable with respect to the pulley track to prevent the winch cable from jumping out of the pulley track. Since the pulley is mounted directly to one side of the tongue of the trailer, the pulley may be mounted directly below or slightly behind of the winch. Accordingly, the direction of pull of the winch cable is more on center and less upward. In addition, the present invention does not require further modification of the trailer and tow vehicle and there is no pulley support bracket through which the winch cable must be passed through.

In operation, a length of cable is first let off the winch and the end of the winch cable normally attached the bow of the boat is attached to the towing vehicle adjacent the vehicle hitch. A portion of the cable is then slipped around the pulley and guide assembly and any excess slack in the cable is taken up by operation of the winch. Either or both of the trailer and tow vehicle brakes are released to permit movement therebetween. Then, as the winch continues to be operated, the trailer tongue and vehicle hitch are brought together to permit the connection to be completed.

Accordingly, one aspect of the present invention is to provide a trailer connecting guide assembly for a trailer having a frame with a forwardly extending tongue providing a hitch connector, a winch mounted to the tongue, and a length of cable connected at one end to the winch and having connecting means attached to the other end and a tow vehicle having a hitch for receiving the hitch connector and means for receiving the connecting means adjacent to the hitch. The trailer connecting guide includes a pulley for receiving and guiding the cable; attachment means for attaching the pulley to one of the sides of the frame in a substantially vertical plane generally parallel to the forwardly extending tongue; and guide means adjacent to the pulley for limiting the lateral movement of the cable when the cable is received in the pulley, the connecting means is connected to the receiving means adjacent to the hitch, and the winch is operated to take up the cable, thereby preventing the cable from disengaging with the pulley and permitting the hitch connector and the hitch to be brought sufficiently close together to permit the connection to be completed.

Another aspect of the present invention is to provide a guide plate for a pulley for receiving and guiding a cable, the pulley including attachment means for attaching the pulley to a frame. The guide plate includes a generally flat support surface adapted to be received between the pulley and the attachment means, the support surface being positioned substantially parallel to the plane defined by the pulley; and guide means attached along one edge of the support surface adjacent to the pulley for limiting the lateral movement of the cable when the cable is received in the pulley, thereby preventing the cable from disengaging with the pulley.

Still another aspect of the present invention is to provide a trailer connecting guide assembly for a trailer having a frame with a forwardly extending tongue providing a hitch connector, a winch mounted to the tongue, and a length of cable connected at one end to the winch and having connecting means attached to the other end and a tow vehicle having a hitch for receiving the hitch connector and means for receiving the connecting means adjacent to the hitch. The trailer connecting guide including a pulley for receiving and guiding the cable; attachment means for attaching the pulley to one of the sides of the frame in a substantially vertical plane generally parallel to the forwardly extending tongue; a generally flat support surface adapted to be received between the pulley and the attachment means, the support surface being positioned substantially parallel to the plane defined by the pulley; and guide means attached along one edge of the support surface adjacent to the pulley for limiting the lateral movement of the cable when the cable is received in the pulley, the connecting means is connected to the receiving means adjacent to the hitch, and the winch is operated to take up the cable, thereby preventing the cable from disengaging with the pulley and permitting the hitch connector and the hitch to be brought sufficiently close together to permit the connection to be completed.

These and other aspects of the present invention will be more clearly understood after review of the following description of the preferred embodiment of the invention when considered with the drawings.

DESCRIPTION OF THE PREFERRED EMBODIMENTS

Figure 2:
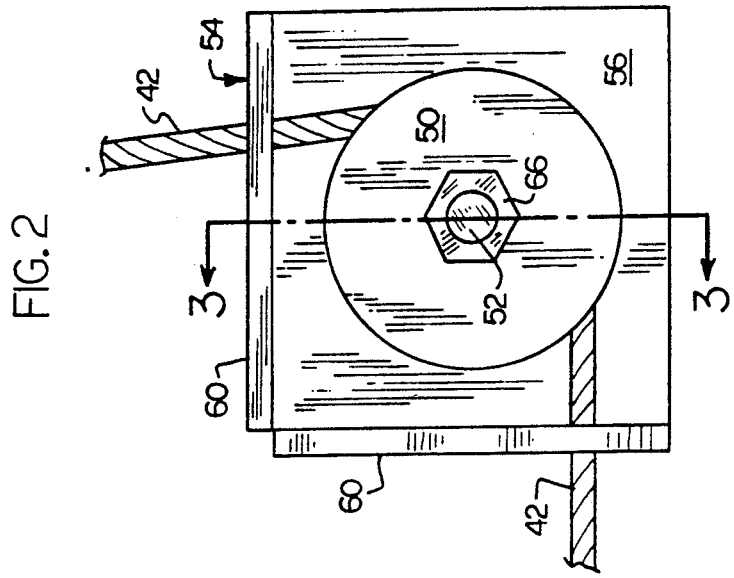
FIG. 2 is an enlarged side elevational view of the trailer connecting guide shown in FIG. 1.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
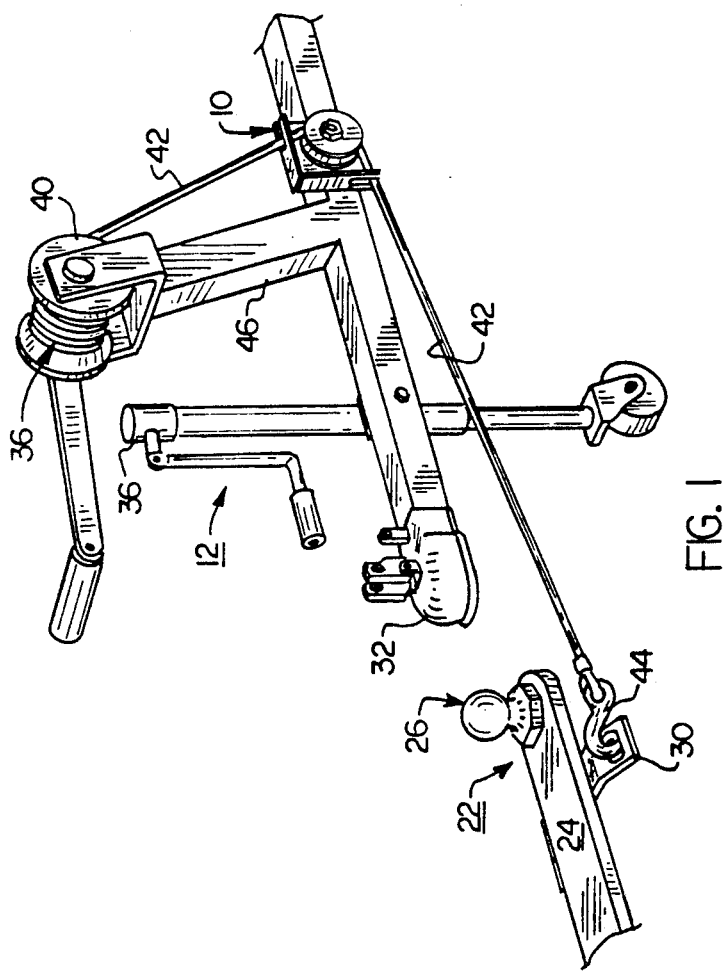
FIG. 1 is a perspective view of a trailer connecting guide, constructed according to the present invention, with the tow vehicle and trailer approaching their final positions for completing the connection.

Referring now to the drawings in general and FIG. 1 in particular, it will be understood that the illustrations are for the purpose of describing a preferred embodiment of the invention and are not intended to limit the invention thereto. As best seen in FIG. 1, a trailer connecting guide assembly, generally designated 10, is shown attached to a trailer 12. Trailer 12 is conveniently represented in the present embodiment as being of the type for transporting boats having at least one pair ground engaging support wheels (not shown). Trailer 12 includes a frame 16 having a forwardly extending tongue 20.

A vehicle hitch 22 is attached to the rear of tow vehicle 14. Vehicle hitch 22 includes a rearwardly extending bracket 24 attached at one end to tow vehicle 14. An upstanding hitch ball 26 is attached to the other end of bracket 24. A pair of holed flanges 30 are attached to each side of bracket 24 between hitch ball 26 and tow vehicle 14. Safety chains (not shown) are normally attached between the trailer frame 16 and flanges 30 when the trailer 12 is being towed.

Trailer 12 includes a conventional hitch ball socket 32 attached to tongue 20. For larger boats, trailer 12 also includes a wheeled jack 34 for supporting the increase weight resting on tongue 20. A conventional, hand or electrically-operated winch assembly 36 is located behind tongue 20 to permit the boat (not shown) to be more easily loaded on trailer 12. Winch assembly 36 includes a winch 40 for holding a portion of cable 42. One end of cable 42 is secured to winch 40 and the other end is attached to a hook 44 adapted to be connected to the bow of the boat. A braced support frame 46 is attached between winch 40 and trailer frame 16.

Since the trailer connecting guide 10 is mounted directly to one side of the tongue 20 of the trailer 12, the trailer connecting guide 10 may be mounted directly below or slightly behind of the winch 40. In the preferred embodiment, the trailer connecting guide 10 is mounted approximately 6 inches behind the winch 40. Accordingly, the direction of pull of the winch cable 42 is more on center and less upward. In addition, the present invention does not require further modification of the trailer 12 and tow vehicle 14 and there is no pulley support bracket through which the winch cable 42 must be passed through.

Turning now to FIG. 2, there is shown an enlarged side elevational view of the trailer connecting guide assembly 10 shown in FIG. 1. Trailer connecting guide assembly 10 includes a pulley 50, a hex bolt 52 for securing the pulley 50 to the trailer frame 16, and a self-adjusting guide plate 54 located between pulley 50 and frame 16. Pulley 50 is a generally conventional pulley having an outer diameter of about 2-9/16 inches. Guide plate 54 includes a substantially flat plate portion 56. A pair of side walls 60 are attached along adjacent edges of plate 56. In the preferred embodiment, guide plate 54 is formed from a single piece of ⅛ inch mild steel by conventional means.

Figure 3:
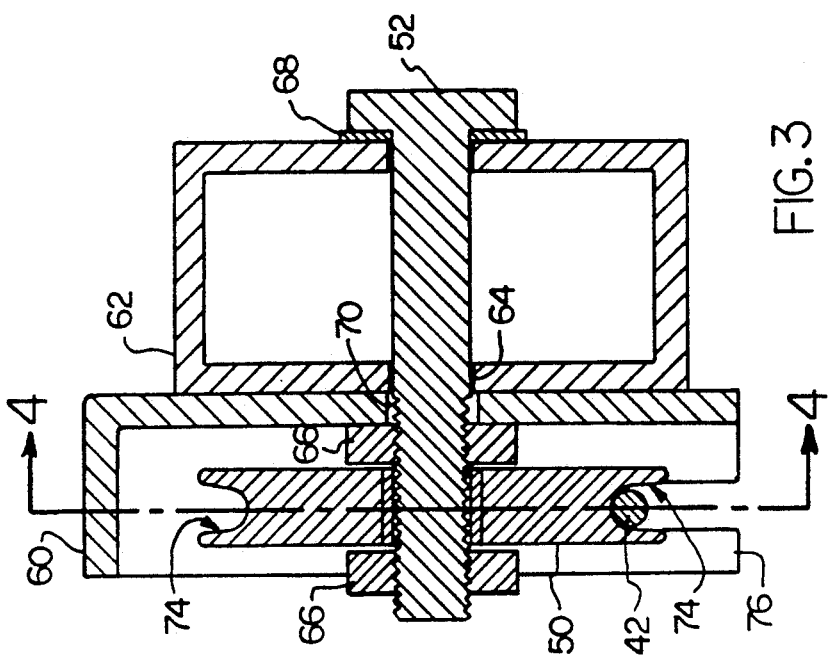
FIG. 3 is a vertical cross-sectional view of the trailer connecting guide shown in FIGS. 1-2, taken along lines 3—3.

As best seen in FIG. 3, a vertical cross-sectional view of the trailer connecting guide assembly 10 shown in FIG. 2, taken along lines 3—3, is illustrated. Trailer frame wall 62 is drilled to provide an aperture 64 for receiving hex bolt 52. A first threaded nut 66 is run up the threaded portion of bolt 52 adjacent to the side of frame wall 62 opposite the head portion of bolt 52 and adjacent to guide plate 54 to secure bolt 52 and guide plate 54 to trailer frame 16. A lock washer 68 may be located between the head portion of bolt 52 and trailer frame 16 for added security. Guide plate 54 includes an aperture 70 which is sized to permit bolt 52 to pass through. A second, self-locking, threaded nut 66 secures the pulley 50 onto bolt 52. A sufficient distance is left between pulley 50 and threaded nuts 66 to permit some lateral movement of pulley 50 along the axis of bolt 52, thereby allowing pulley 50 to freely rotate about the axis of bolt 52.

In the preferred embodiment, pulley 50 includes a bronze wear bushing 72 sized to receive bolt 52. The tolerance between the bushing 72 and bolt 52 is chosen to be sufficiently large for preventing binding of the pulley 50, while at the same time, to be sufficiently small to reduce the tendency of the pulley to wobble about the axis of bolt 52. A tolerance of between about 2 and 10 mils has been used with about 3 mils being preferred.

The pulley 50 includes a pulley track 74 for receiving and guiding cable 42. In addition, side wall 60 includes an elongated slot 76 which is sized to receive cable 42 and to limit the lateral motion thereof.

Figure 4:
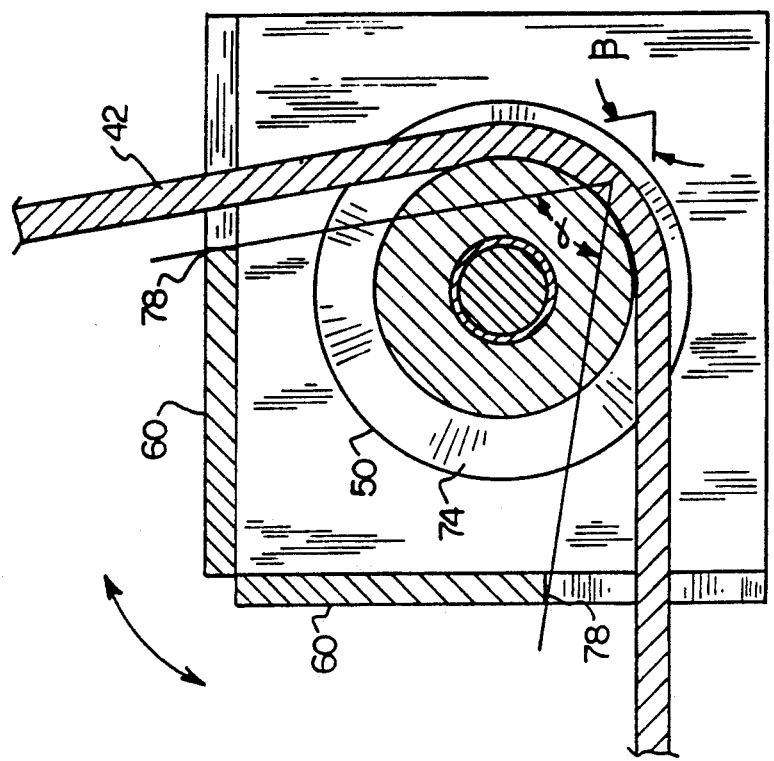
FIG. 4 is a vertical cross-sectional view of the trailer connecting guide shown in FIGS. 1-3, taken along line 4—4.

Turning to FIG. 4, there is shown a vertical cross-sectional view of the trailer connecting guide assembly 10 shown in FIG. 3, taken along line 4—4. Guide slot 76 is sized to prevent cable 42 from contacting the base 78 of slot 76. Also, as discussed above, guide plate 54 includes an aperture 70 which is sized to permit bolt 52 to pass through without binding. Accordingly, first threaded nut 66 may be loosen to permit guide plate 54 to be rotated about the axis of bolt 52. As a result, guide plate 54 may be moved depending on the position of cable 42, thereby reducing the opportunity for cable 42 to be frayed by continuous contact with side walls 60.

In operation, a length of cable 42 is first let off the winch 40 and the end of the winch cable 42 normally attached the bow of the boat is attached to the towing vehicle 14 adjacent the vehicle hitch 22. A portion of the cable 42 is then slipped around the pulley 50 and through guide slots 76 and any excess slack in the cable 42 is taken up by operation of the winch 40. Either or both of the trailer and tow vehicle brakes are released to permit movement therebetween. Then, as the winch 40 continues to be operated, the trailer tongue 20 and vehicle hitch 22 are brought sufficiently close together to permit the connection to be completed.

Certain modifications and improvements will occur to those skilled in the art upon reading of the foregoing description. By way of example, the length and width of the guide slot can be varied depending on the location of the trailer connecting guide, the diameter of the pulley, and the diameter of the winch cable. Also, other types of pulleys, including rubber rollers, could be substituted. Finally, the relative positions of the end cap and the second threaded nut could be reversed without adversely affecting the operation of the present invention. It should be understood that all such modifications and improvements have been deleted herein for the sake of conciseness and readability but are properly within the scope of the following claims.

We claim:

1. A guide plate for a pulley for receiving and guiding a cable, said pulley including attachment means for attaching said pulley to a frame, said guide plate comprising:
   (a) a generally flat support plate adapted to be received between said pulley and said attachment means, said support plate being positioned substantially parallel to the plane defined by said pulley; and
   (b) guide means attached along one edge of said support plate adjacent to said pulley for limiting the lateral movement of said cable when said cable is received in said pulley, thereby preventing said cable from disengaging with said pulley, wherein said guide means includes a pair of side walls perpendicular to said support plate and adjacent to one another, each of said side walls having an open end elongated slot for removably receiving said cable.

2. The apparatus according to claim 1, wherein said support plate is adapted to be movable about the axis of said pulley.

3. A trailer connecting guide assembly for a trailer having a frame with a forwardly extending tongue providing a hitch connector, a winch mounted to said tongue, and a length of cable connected at one end to said winch and having connecting means attached to the other end and a tow vehicle having a hitch for receiving said hitch connector and means for receiving said connecting means adjacent to said hitch, said assembly comprising:
   (a) a pulley for receiving and guiding said cable;
   (b) attachment means for attaching said pulley to said frame in a substantially vertical plane generally parallel to said forwardly extending tongue;
   (c) a generally flat support plate adapted to be received between said pulley and said attachment means, said support plate being positioned substantially parallel to the plane defined by said pulley; and
   (d) guide means attached along one edge of said support plate adjacent to said pulley for limiting the lateral movement of said cable when said cable is received in said pulley, said connecting means is connected to said receiving means adjacent to said hitch, and said winch is operated to take up said cable, thereby preventing said cable from disengaging with said pulley and permitting said hitch connector and said hitch to be brought sufficiently close together to permit the connection to be completed, wherein said guide means includes a pair of side walls perpendicular to said support plate and adjacent to one another, each of said side wall having an open end elongated slot for removably receiving said cable.

4. The apparatus according to claim 3, wherein said attachment means includes an elongated threaded fastener adapted to attach to said frame at one end, said fastener being sized to permit said pulley to freely rotate about said fastener.

5. The according to claim 3, wherein said fastener a threaded nut at the other end to limit the lateral movement of said pulley.

6. The apparatus according to claim 3, wherein said pulley includes a groove extending about the periphery of said pulley for receiving and guiding said cable.

7. The apparatus according to claim 6, wherein said pulley includes a wear resistant bushing sized to permit said pulley to rotate freely about said attachment means.

8. The apparatus according to claim 3, wherein said support plate is adapted to be movable about the axis of said pulley.

* * * * *